United States Patent
Qian et al.

(10) Patent No.: US 11,200,454 B1
(45) Date of Patent: Dec. 14, 2021

(54) PEOPLE SELECTION FOR TRAINING SET

(71) Applicant: ObjectVideo Labs, LLC, Tysons, VA (US)

(72) Inventors: Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 183 days.

(21) Appl. No.: 16/655,719

(22) Filed: Oct. 17, 2019

Related U.S. Application Data

(60) Provisional application No. 62/746,783, filed on Oct. 17, 2018.

(51) Int. Cl.
*G06K 9/62* (2006.01)
*G06N 20/00* (2019.01)
*G06K 9/00* (2006.01)

(52) U.S. Cl.
CPC ....... *G06K 9/6256* (2013.01); *G06K 9/00362* (2013.01); *G06K 9/6262* (2013.01); *G06K 9/6268* (2013.01); *G06N 20/00* (2019.01)

(58) Field of Classification Search
CPC .. G06K 9/00288; G06K 9/295; G06K 9/6256; G06K 9/6262; G06N 20/00
See application file for complete search history.

(56) References Cited

U.S. PATENT DOCUMENTS

| | | | | |
|---|---|---|---|---|
| 8,559,684 B1* | 10/2013 | Nechyba | ............ | G06K 9/00926 382/118 |
| 10,268,950 B2* | 4/2019 | Yin | ......... | G06N 20/00 |
| 2006/0177110 A1* | 8/2006 | Imagawa | ........... | G06K 9/00228 382/118 |
| 2007/0297650 A1* | 12/2007 | Rabinovich | .......... | G06K 9/6255 382/118 |
| 2009/0210362 A1* | 8/2009 | Xiao | .................... | G06K 9/6256 706/12 |
| 2010/0329517 A1* | 12/2010 | Zhang | ................ | G06K 9/00248 382/118 |
| 2019/0012525 A1* | 1/2019 | Wang | ................. | G06K 9/00295 |

* cited by examiner

*Primary Examiner* — Wen W Huang
(74) *Attorney, Agent, or Firm* — Fish & Richardson P.C.

(57) ABSTRACT

Methods, systems, and apparatus, including computer programs encoded on a computer storage medium, for selecting people for a training set. The methods, systems, and apparatus include actions of: obtaining an image of a user, obtaining an initial training set that includes the image of the user as a positive example and images of a subset of a set of other people as negative examples, training an initial classifier with the images of the initial training set, determining false positive classifications by the initial classifier, selecting people in the set of other people based on the false positive classifications, obtaining an updated training set that includes an image of the user, images of the subset of the set of other people, and images of the people that are selected, and generating an updated classifier with the updated training set.

17 Claims, 2 Drawing Sheets

PEOPLE SELECTION FOR TRAINING SET

CROSS REFERENCE TO RELATED APPLICATIONS

This application claims benefit of U.S. Provisional Application No. 62/746,783, filed on Oct. 17, 2018, titled "PEOPLE SELECTION FOR TRAINING SET," which is incorporated by reference in its entirety.

TECHNICAL FIELD

This disclosure application relates generally to monitoring systems, and more particularly, to training of a classifier.

SUMMARY

Techniques are described for selecting people for a training set to train a classifier to classify whether a face belongs to a particular person. A classifier that is trained to classify whether a face belongs to a particular person may be used for facial recognition purposes. In a particular use case, a classifier trained to classify whether a face belongs to a particular user may be used to verify the identity of the person disarming a security panel.

In this use case, each user of a home security may be associated with a unique disarm code. When the security panel is disarmed, an image of the person that disarmed the security panel may be captured by a camera in the security panel and used for face recognition to verify if the person disarming the panel matches the identity of the user associated with the disarm code. When the face recognition does not match, the system may perform one or more of the following actions, provide a notification to the user whose code was used, provide a notification to all users of the security system, re-arm the system, or perform some other action.

Accuracy of the classifier may be important so that the system does not unnecessary trigger actions or fail to trigger actions that it should have triggered. For example, a user may be annoyed if the system classifies the user as someone else when the user disarms the system and a user may not trust the system if the system classifies another person as the user. To achieve robust face recognition, in addition to the images of the user as positive examples, images of a set of other people may be used in classifier training as negative examples.

When training a classifier, face images from a large pool of people may be available for training. A problem is how to select a good set of people for distinguishing a user from all other people. It may be computationally prohibitive to include all people in the pool in training the classifier for a user. It may be desirable to include more people that have similar race, gender, and age to the user as negative examples as these people may look more similar to the user and inclusion of these people as negative examples may ensure that the classifier is able to distinguish people that look similar to the user from the user. However, information regarding a user's race, gender, and age may be unavailable.

To result in a more accurate classifier, the system may validate a trained classifier against images of other people with whom the classifier wasn't trained. For those people that are incorrectly classified as the user, the system may add images of those people to an updated training set and then use the updated training set to train the classifier to be more accurate than the classifier trained with the initial training set. The training and validation may be repeated until stopping criteria is satisfied, and the final trained classifier may be used in monitoring a home.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Figure 1:
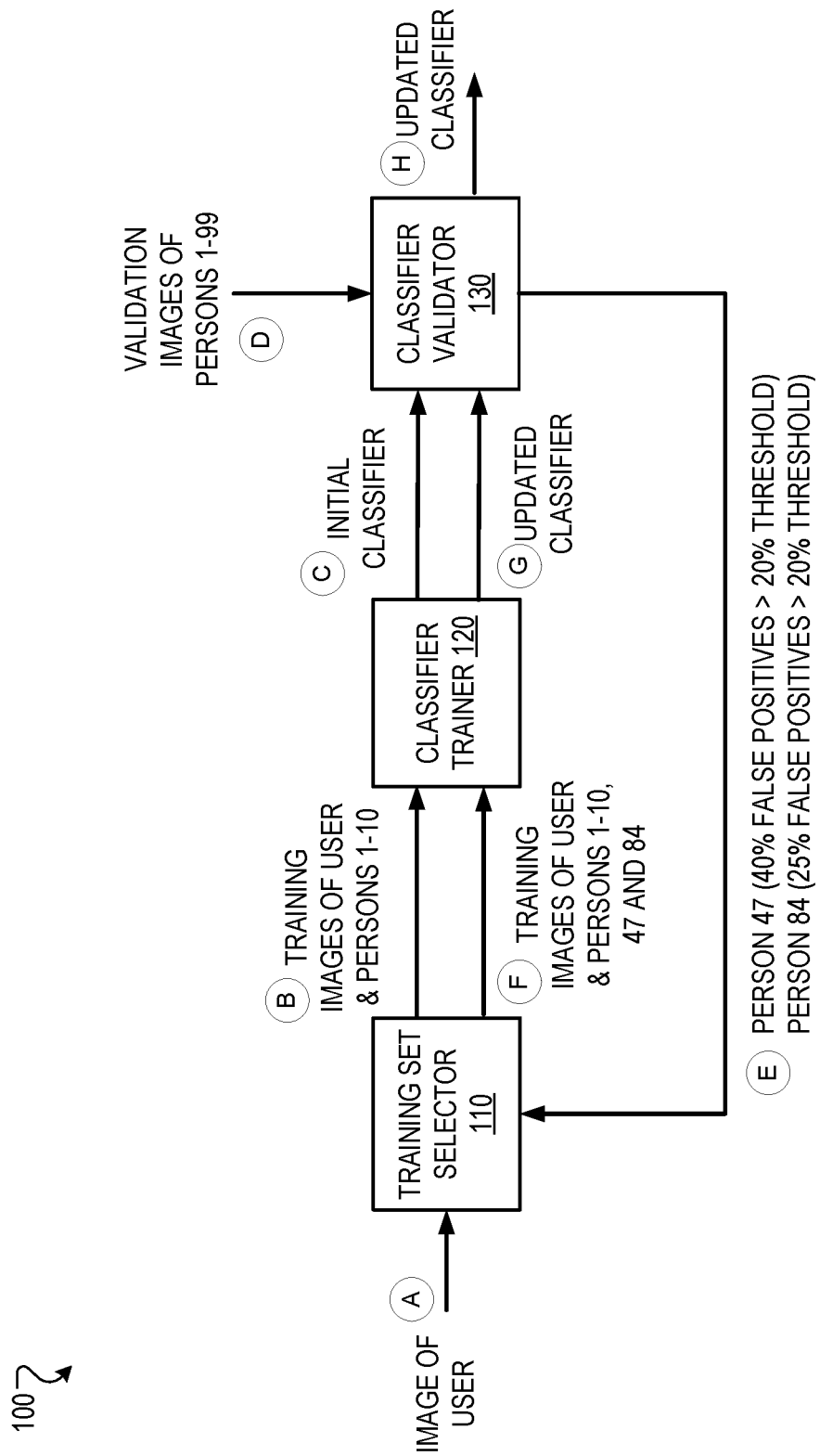
FIG. 1 illustrates a block diagram of an example system for selecting people for a training set.

FIG. 1 illustrates an example block diagram of a system 100 for selecting people for a training set. The system 100 includes a training set selector 110 that selects people for a training set, a classifier trainer 120 that trains a classifier using the training set, and a classifier validator 130 that validates accuracy of the classifier.

The system 100 may be used to train a classifier that classifies whether a face in an image belongs to a particular user. For example, the system 100 may train a classifier that classifies whether a face shown in an image is John Doe's face or not John Doe's face. The trained classifier may then be used for home security purposes. For example, images from a home may be provided to the trained classifier for the trained classifier to indicate whether an image taken by a security panel of a person inputting a disarm code that is unique to John Doe is an image of John Doe.

The training set selector 110 selects an initial set of people for inclusion in an initial training set. For example, the training set selector 110 may select persons 1-10 to include in an initial training set. The initial set of people may be selected from a larger set of people. For example, the initial set of people may be ten people selected from a set of ninety-nine people. The set of ninety-nine people may be people that are various genders and various races, and the ten people selected may similarly be of various genders and various races.

The training set selector 110 may select the same initial set of people for all users. For example, the training set selector 110 may select the same initial set of people for John Doe in one home and Jane Nobody in another home. Alternatively, the training set selector 110 may select a different initial set of people for different users. For example, the training set selector 110 may determine that a home for a user is in an area that has many people of a particular race and, in response, select more people of that race for the initial set of people. In another example, the training set selector 110 may determine that a home has a second user and, in response, select the second user to include in the initial set of people along with nine other people in the set of people.

The training set selector 110 may obtain images of the people included in the initial set of people and provide those images to the classifier trainer 120. For example, the system 100 may store forty images of each person in a set of ninety-nine people, where twenty images of each person are training images used for training and twenty different images of each person are validation images used for validating the trained classifier. The training set selector 110 may retrieve the twenty training images of each of the ten people selected for inclusion in the initial training set from storage and provide those images to the classifier trainer 120 as negative examples along with twenty images of the user as positive examples.

The training images and validation images may be different so that classifiers may be more accurately validated. Each image of a person may be stored with a label that indicates that the image is either a training image or a validation image, and the labels may be used by the system 100 to ensure that a training image is not used for validation and a validation image is not used for training.

The training set selector 110 may also receive indications of people to add to a training set to generate an updated training set. For example, the training set selector 110 may receive an indication from the classifier validator 130 to add persons 47 and 84 to an updated training set and, in response, generate an updated training set that includes the twenty training images of each person of persons 1-10 and twenty training images of each person of persons 47 and 84 all as negative examples and the twenty training images of the user as positive examples, and provide the updated training set to the classifier trainer 120.

The classifier trainer 120 may train a classifier with a training set that the classifier trainer 120 receives from the training set selector 110. For example, the classifier trainer 120 may first receive an initial training set with twenty images each of a user and persons 1-10, train a classifier with the initial training set, then receive an updated training set with twenty images each of the user and persons 1-10, 47, and 84, and train a classifier with the updated training set. The classifier trainer 120 may train the classifier using deep learning and machine learning. The classifier trainer 120 may provide the trained classifier to the classifier validator 130 to validate the classifier.

The classifier validator 130 may receive a classifier and validate the classifier. For example, the classifier validator 130 may receive a classifier trained with an initial training set of images of the user and persons 1-10, validate the classifier, then receive an updated classifier trained with an updated training set of images of the user and persons 1-10, 47 and 84, and validate the updated classifier.

The classifier validator 130 may validate a classifier using validation images of people in the set of people. For example, the classifier validator 130 may provide the twenty validation images of each of the ninety-nine people in the set of people to the classifier and determine which validation images are incorrectly classified as the user. For each of the people, the classifier validator 130 may determine a false positive rate. For example, the classifier validator 130 may determine a false positive rate of 40% for person 47 in the set of people, a false positive rate of 25% for person 84 in the set of people, and a false positive rate of less than 20% for a remaining 97 people out of 99 people.

The classifier validator 130 may determine the false positive rate for a particular person based on determining the number of validation images for the particular person that are classified as the user divided by the number of validation images for the particular person. For example, the classifier validator 130 may determine a false positive rate of 10% by determining that two validation images for a particular person out of twenty validation images were classified as the user.

The classifier validator 130 may identify persons to add to a training set based on the false positive rates. For example, the classifier validator 130 may determine that persons 47 and persons 84 both have false positive rates that are above a false positive threshold of 10%, 20%, 30% or some other percentage, and, in response, identify persons 47 and 84 as persons that should be added to the training set. In another example, the classifier validator 130 may determine that persons 11-46, persons 48-83, and persons 85-99 all have false positive rates that are below a false positive threshold of 10%, 20%, 30% or some other percentage, and, in response, determine the persons should not be added to the training set.

The classifier validator 130 may determine whether the classifier should be further updated or not. For example, the classifier validator 130 may determine that the classifier trained on the initial training set should be updated and the classifier trained on the updated training set should not be updated.

In some implementations, the classifier validator 130 may determine whether the classifier should be further updated based on whether any persons have false positive rates that satisfy a false positive threshold. For example, the classifier validator 130 may determine that persons 47 and 84 have false positive rates that satisfy the false positive threshold and, in response, indicate to the training set selector 110 to add the persons to the training set and retrain the classifier. In another, the classifier validator 130 may determine that no persons of the ninety-nine people in the set have false positive rates that satisfy the false positive threshold and, in response, use the classifier in a home.

In some implementations, the classifier validator 130 may determine whether the classifier should be further updated based on a number of persons that have false positive rates that satisfy a false positive threshold. For example, the classifier validator 130 may determine that five persons have false positive rates that satisfy the false positive threshold, five is above a threshold of three and, in response, indicate to the training set selector 110 to add the five persons to the training set. In another, the classifier validator 130 may determine that two persons have false positive rates that satisfy the false positive threshold, two is not above a threshold of three and, in response, use the classifier in a home.

In some implementations, the classifier validator 130 may determine whether the classifier should be further updated based on a number of iterations of training. For example, the classifier validator 130 may determine not to perform validation as a maximum number of iterations, e.g., three, five, eight or some other number, of training has been performed so the last trained classifier should be used in the home.

In some implementations, functionality of the training set selector 110, the classifier trainer 120, and the classifier validator 130 may be combined or separated. For example, the classifier validator 130 may determine false positive rates and provide those rates to the training set selector 110 and the training set selector 110 may then select persons to include based on the false positive rates.

Figure 2:
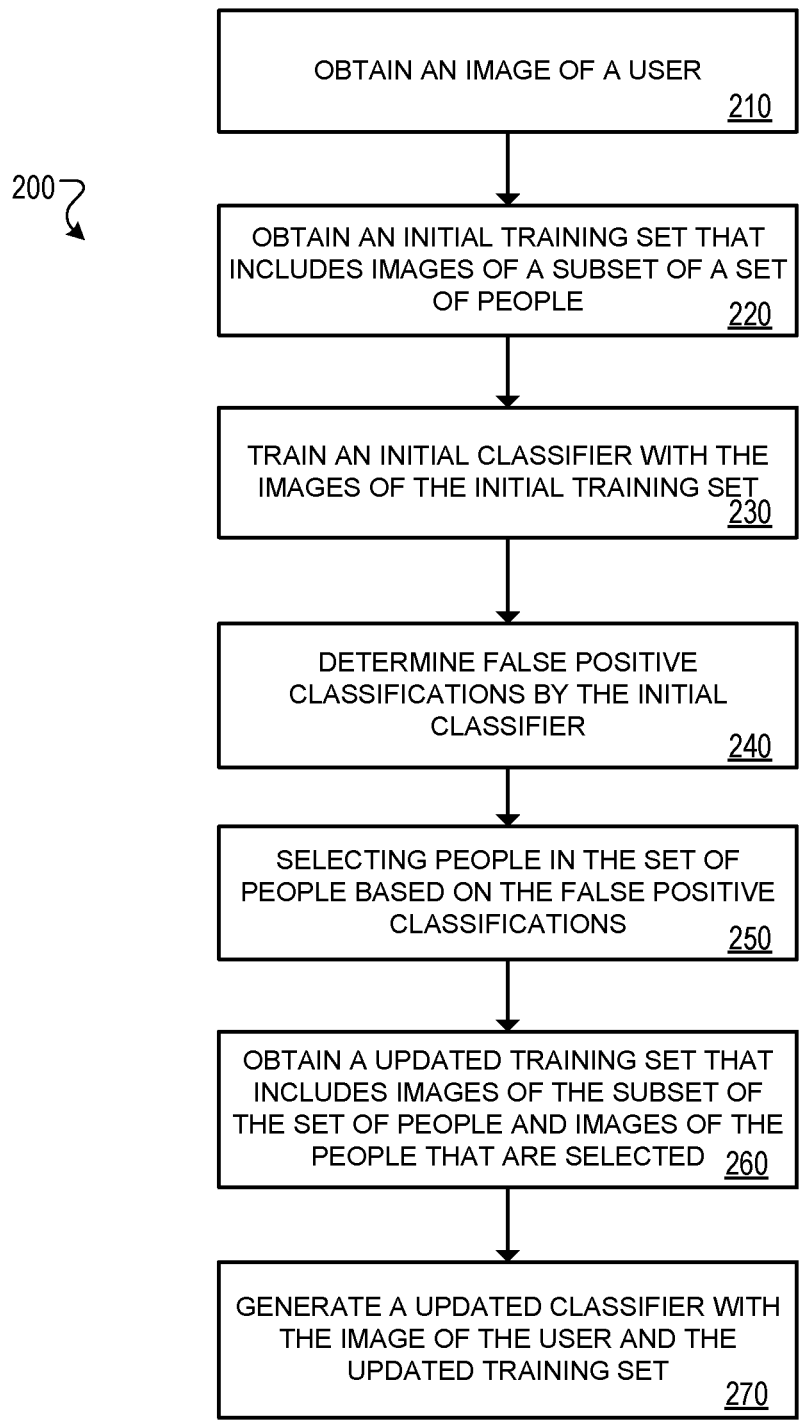
FIG. 2 is a flow diagram of an example process for selecting people for a training set.

FIG. 2 is a flow diagram of an example process 200 for selecting people for a training set. Process 200 can be implemented using system 100 described above or some other system. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes obtaining an image of a user (210). For example, the training set selector 110 may receive twenty images of a user captured by a security panel after the user requests to enroll to receive a disarm code that is unique to the user. In some implementations, obtaining an image of a user includes the training set selector 110 obtaining multiple images of the user captured by a camera at a property. For example, the training set selector 110 may retrieve the images of the user from a database that receives and stores an image of the user that was captured by a camera in a security panel each time that the user enters a disarm code that is specific to the user. In some implementations, obtaining an image of a user includes obtaining multiple images of the user captured by a camera at a property, where both the initial training set and the updated training set includes the multiple images of the user as positive examples.

The process 200 includes obtaining an initial training set that includes the image of the user as a positive example and images of a subset of a set of other people as negative examples (220). For example, the training set selector 110 may generate an initial training set that includes the twenty images of the user as positive examples and twenty images each of persons 1-10 as negative examples.

In some implementations, obtaining an initial training set that includes the image of the user as a positive example and images of a subset of a set of other people as negative examples includes obtaining, from a database, a set of images for each person in the subset of the set of other people. For example, the training set selector 110 may, for each of ten people in the subset of the set of people, receive all twenty of the images of that person that are labeled as training images and include those images in the initial training set.

In some implementations, obtaining an initial training set that includes the image of the user as a positive example and images of a subset of a set of other people as negative examples includes labeling the image of the user as a positive example and labeling the sets of images of the set of other people as negative examples. For example, the training set selector 110 may label each of the twenty training images of each of the ten people, a total of two hundred, as a negative example of not the user and label each of the twenty images of the user as a positive example of the user.

The process 200 includes training an initial classifier with the images of the initial training set (230). For example, the classifier trainer 120 may train an initial classifier using the initial training set that includes the twenty images of the user as positive examples and twenty images each of persons 1-10.

The process 200 includes determining false positive classifications by the initial classifier (240). For example, the classifier validator 130 may determine that out of the twenty validation images for person 47, eight are classified by the initial classifier as the user so are false positives and that out of the twenty validation images for person 84, five are classified by the initial classifier as the user so are false positives.

In some implementations, determining false positive classifications by the initial classifier includes providing images of the set of other people to the initial classifier where the images are not included in the training set and are included in a validation set, identifying the images of the set of other people that are classified as the user, and determining classifications of the images of the set of other people classified as the user as false positive classifications. For example, the classifier validator 130 may provide twenty validation images of person 47 to the initial classifier, identify that five of the validation images of person 47 are classified as the user, and determine that those five classifications for the validation images of person 47 are false positive classifications and the classifications for the remaining fifteen validation images of person 47 are true negative classifications.

The process 200 includes selecting people in the set of other people based on the false positive classifications (250). For example, the classifier validator 130 may select persons 47 and 84 to include in an updated training set.

In some implementations, selecting people in the set of other people based on the false positive classifications includes determining that the people have false positive error rates, that correspond to the false positive classifications, that satisfy a false positive criterion and, in response to determining that the people have false positive error rates that satisfy a false positive criterion, selecting the people that correspond to images with false positive classifications.

In some implementations, determining that the people have false positive error rates, that correspond to the false positive classifications, that satisfy a false positive criterion includes determining that a false positive error rate of a particular person whose image was not included in the initial training set, as a percentage of validation images of the particular person that were falsely classified as the user, is greater than the false positive criteria of twenty percent.

For example, the training set selector 110 may determine that person 47 has a false positive rate of 25% based on that five of the twenty validation images of person 47 were false positive classifications, and that 25% satisfies a false positive criteria of false positive rate greater than 20%. In another example, the training set selector 110 may determine that person 46 has a false positive rate of 10% based on that two of the twenty validation images of person 46 were false positive classifications, and that 10% does not satisfy a false positive criteria of false positive rate greater than 20%.

The process 200 includes obtaining an updated training set that includes an image of the user, images of the subset of the set of other people, and images of the people that are selected (260). For example, the training set selector 110 may generate an updated training set by taking the initial training set and adding the training images of persons 47 and 84. In some implementations, obtaining an updated training set that includes the image of the user, images of the subset of the set of other people, and images of the people that are selected includes including all training images for each person whose false positive error rate satisfies false positive criteria.

Accordingly, training images of a particular person that are correctly classified as not a user may still be added to the updated training set along with the training images of the particular person that are misclassified as the user if the false positive criteria are satisfied for the particular person. Similarly, training images of a particular person that are misclassified as the user may still not be added to the updated training if the false positive criteria is not satisfied for the particular person.

In some implementations, obtaining an updated training set that includes the image of the user, images of the subset of the set of other people, and images of the people that are selected includes obtaining, from a database, the images of the people that are selected and labeling the images of the people that are selected as negative examples. For example, the training set selector 110 may select all twenty training images of person 47 from a database, and then label each of the twenty training images of person 47 as negative examples of not the user.

The process 200 includes generating an updated classifier with the images of the user and the updated training set (270). For example, the classifier trainer 120 may receive the updated training set from the classifier trainer 120 and then train an updated classifier using the updated training set.

In some implementations, process 200 may be entirely done automatically within a production environment such that no human sees a user's images nor does anyone select, for inclusion in a training set, the images of other people in the set of other people.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining an image of a user;
   obtaining an initial training set that includes the image of the user as a positive example and images of a subset of a set of other people as negative examples;
   training an initial classifier with the images of the initial training set;
   determining false positive classifications by the initial classifier;
   selecting people in the set of other people based on the false positive classifications,
      where selecting the people includes determining that a rate of false positive classifications in a set of images of a particular person satisfies a false positive criterion;
   based on determining that the rate of false positive classifications in the set of images of the particular person satisfies the false positive criterion, obtaining an updated training set that includes an image of the user, images of the subset of the set of other people, and images of the people that are selected,
      where the images of the people that are selected include images of the particular person; and
   generating an updated classifier with the updated training set.

2. The method of claim 1, wherein determining false positive classifications by the initial classifier comprises:
   providing images of the set of other people to the initial classifier where the images are not included in the training set and are included in a validation set;
   identifying the images of the set of other people that are classified as the user; and
   determining classifications of the images of the set of other people classified as the user as false positive classifications.

3. The method of claim 1, wherein obtaining an initial training set that includes images of a subset of a set of other people includes:
   obtaining, from a database, a set of images for each person in the subset of the set of other people.

4. The method of claim 3, wherein obtaining an initial training set that includes images of a subset of a set of other people comprises:
   labeling the image of the user as a positive examples; and
   labeling the sets of images of the set of other people as negative examples.

5. The method of claim 1, wherein obtaining an updated training set that includes the image of the user, images of the subset of the set of other people, and images of the people that are selected comprises:
   obtaining, from a database, the images of the people that are selected; and
   labeling the images of the people that are selected as negative examples.

6. The method of claim 1, wherein obtaining an image of a user comprises:
   obtaining multiple images of the user captured by a camera at a property,
   where both the initial training set and the updated training set includes the multiple images of the user as positive examples.

7. The method of claim 1, wherein the images of the particular person that are selected to be included in the updated training set are different from the images in the set of images of the particular person.

8. A system comprising:
   one or more computers and one or more storage devices storing instructions that are operable, when executed by the one or more computers, to cause the one or more computers to perform operations comprising:
   obtaining an image of a user;
   obtaining an initial training set that includes the image of the user as a positive example and images of a subset of a set of other people as negative examples;

training an initial classifier with the images of the initial training set;

determining false positive classifications by the initial classifier;

selecting people in the set of other people based on the false positive classifications, where selecting the people includes determining that a rate of false positive classifications in a set of images of a particular person satisfies a false positive criterion;

based on determining that the rate of false positive classifications in the set of images of the particular person satisfies the false positive criterion, obtaining an updated training set that includes an image of the user, images of the subset of the set of other people, and images of the people that are selected, where the images of the people that are selected include images of the particular person; and generating an updated classifier with the updated training set.

9. The system of claim 8, wherein determining false positive classifications by the initial classifier comprises:

providing images of the set of other people to the initial classifier where the images are not included in the training set and are included in a validation set;

identifying the images of the set of other people that are classified as the user; and determining classifications of the images of the set of other people classified as the user as false positive classifications.

10. The system of claim 8, wherein obtaining an initial training set that includes images of a subset of a set of other people includes:

obtaining, from a database, a set of images for each person in the subset of the set of other people.

11. The system of claim 10, wherein obtaining an initial training set that includes images of a subset of a set of other people comprises:

labeling the image of the user as a positive examples; and
labeling the sets of images of the set of other people as negative examples.

12. The system of claim 8, wherein obtaining an updated training set that includes the image of the user, images of the subset of the set of other people, and images of the people that are selected comprises:

obtaining, from a database, the images of the people that are selected; and labeling the images of the people that are selected as negative examples.

13. The system of claim 8, wherein obtaining an image of a user comprises:

obtaining multiple images of the user captured by a camera at a property, where both the initial training set and the updated training set includes the multiple images of the user as positive examples.

14. A non-transitory computer-readable medium storing software comprising instructions executable by one or more computers which, upon such execution, cause the one or more computers to perform operations comprising:

obtaining an image of a user;

obtaining an initial training set that includes the image of the user as a positive example and images of a subset of a set of other people as negative examples;

training an initial classifier with the images of the initial training set;

determining false positive classifications by the initial classifier;

selecting people in the set of other people based on the false positive classifications, where selecting the people includes determining that a rate of false positive classifications in a set of images of a particular person satisfies a false positive criterion;

based on determining that the rate of false positive classifications in the set of images of the particular person satisfies the false positive criterion, obtaining an updated training set that includes an image of the user, images of the subset of the set of other people, and images of the people that are selected, where the images of the people that are selected include images of the particular person; and generating an updated classifier with the updated training set.

15. The medium of claim 14, wherein determining false positive classifications by the initial classifier comprises:

providing images of the set of other people to the initial classifier where the images are not included in the training set and are included in a validation set;

identifying the images of the set of other people that are classified as the user; and determining classifications of the images of the set of other people classified as the user as false positive classifications.

16. The medium of claim 14, wherein obtaining an initial training set that includes images of a subset of a set of other people includes:

obtaining, from a database, a set of images for each person in the subset of the set of other people.

17. The medium of claim 14, wherein obtaining an initial training set that includes images of a subset of a set of other people comprises:

labeling the image of the user as a positive examples; and
labeling the sets of images of the set of other people as negative examples.

* * * * *